Patented July 27, 1954

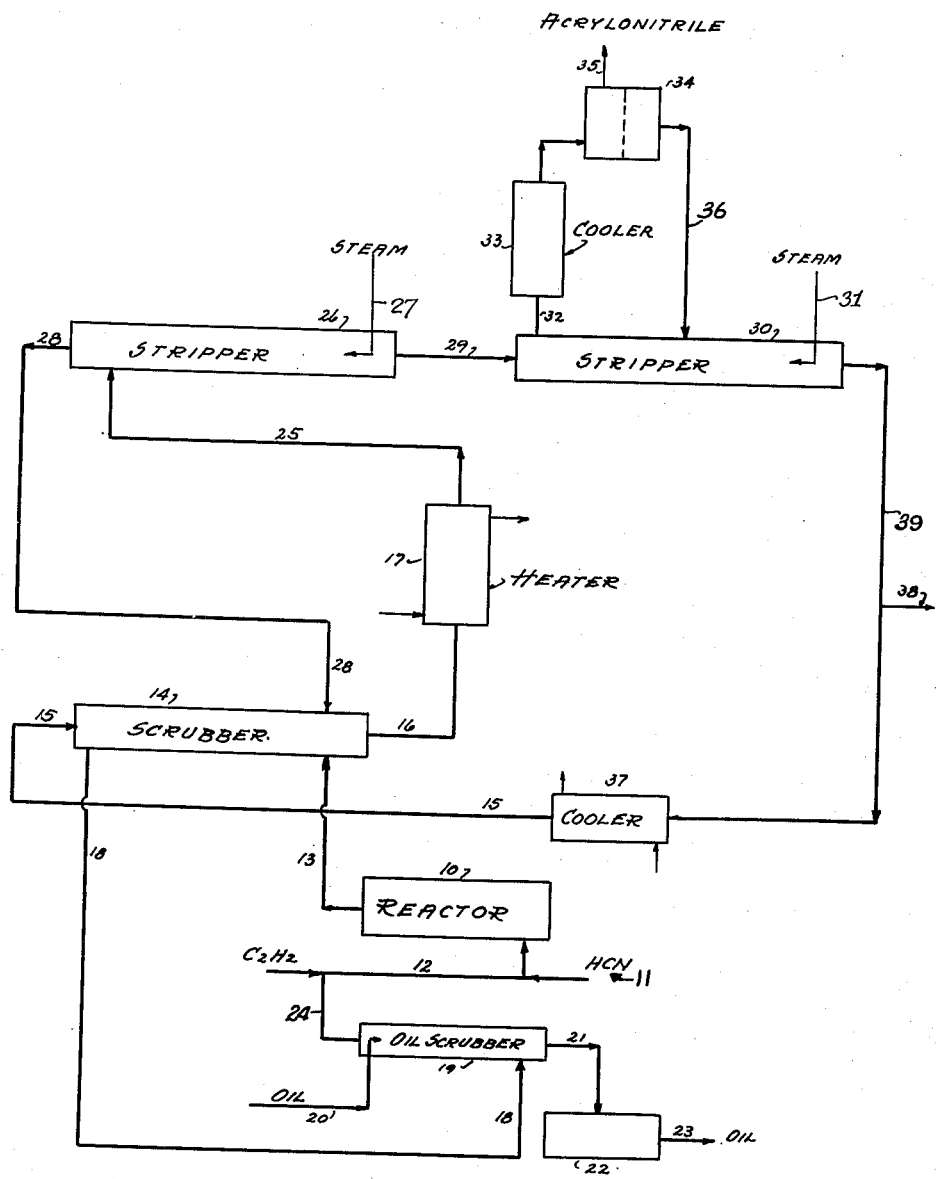

2,684,978

UNITED STATES PATENT OFFICE 2,684,978

PROCESS FOR PRODUCING ACRYLONITRILE

Carlyle J. Stehman, Dayton, Ohio, assignor to Monsanto Chemical Company, St. Louis, Mo., a corporation of Delaware Application April 2, 1951, Serial No. 218,720

2 Claims. (Cl. 260—465.3)

This invention provides an improvement process for producing acrylonitrile from acetylene and hydrocyanic acid.

When acrylonitrile is formed by the reaction of acetylene with hydrocyanic acid in the presence of acidic cuprous chloride solution, as described in BIOS (British Intelligence Objectives Sub-committee, 1947; London, England) Report No. 1057 and also in U. S. Patent Re. 23,265 dated September 5, 1950, a crude product is obtained which contains acrylonitrile together with acetylene, hydrocyanic acid, acetaldehyde and lactonitrile, as well as one or more acetylenic polymer-forming impurities such as 2-chlorobutadiene, monovinyl acetylene, divinyl acetylene and vinyl chloride. It is generally the practice in this process to scrub the reaction mixture formed by the catalytic reaction with water in order to separate the excess acetylene from the product. The excess acetylene is then recycled to the process.

When distillation of water solutions of crude acrylonitrile is attempted the more volatile acetylenic polymer-forming impurities are volatilized and separated from the higher boiling acrylonitrile. It has been found however, that during distillation of the crude product, either in the presence or absence of water, the acetylenic polymer-forming impurities undergo polymerization with the result that the upper part of the distillation column in which such distillation is carried out is rapidly filled with a solid polymer making necessary the frequent interruption of the distillation operation for cleaning purposes. It has also been found that the acrylonitrile and divinyl acetylene form an azeotrope boiling at 75° C. at atmospheric pressure, making a separation between the divinyl acetylene and the acrylonitrile, which boils at 78.5° C., a difficult operation.

Essentially my invention provides a method for the production of acrylonitrile wherein acetylenic polymer-forming impurities are removed from the product. In the present process the gaseous product obtained by the reaction between acetylene and HCN is first scrubbed with water. By solution in water the acrylonitrile is separated from the accompanying excess acetylene. The excess acetylene containing polymer-forming impurities is treated for removal of the impurities and then returned to the reactor where it is combined with additional hydrocyanic acid.

The water solution of acrylonitrile containing some of the polymer-forming impurities formed in the reaction is treated with steam at a temperature at which these impurities are volatilized without however volatilizing major amounts of the contained acrylonitrile. The volatilized impurities, together with the acrylonitrile simultaneously volatilized, are treated with water to remove acrylonitrile. The gaseous polymer impurities which are then in concentrated form are treated with absorbents and thus removed from the acetylene. A water solution of acrylonitrile, which is free of the above-mentioned impurities, is thus obtained. This solution is treated with additional steam at a somewhat higher temperature, whereby substantially all of the acrylonitrile is boiled out of the water. The acrylonitrile which is boiled out and water are cooled and permitted to separate into two layers. The upper layer consists of acrylonitrile saturated with water. The lower layer consists of water which is returned to the boiling zone. Thus, the water is substantially free of acrylonitrile and polymer-forming impurities and may be returned to the scrubber for treating additional acrylonitrile containing gas from the catalytic reactor.

The accompanying drawing illustrates the details of my invention.

In the drawing, numeral 10 indicates a reactor containing a hydrochloric acid solution of cuprous chloride, 11 indicates a supply of HCN, while 12 indicates a supply of acetylene to the reactor. Generally the number of moles of acetylene supplied is from 6 to 10 times the number of moles of HCN supplied to the reactor 10.

The products of reaction leave reactor 10 by pipe 13 and comprise the following in the approximate proportions indicated:

| | Moles |
|---|---|
| Acrylonitrile | 13.8 |
| Acetylene | 146.0 |
| Hydrocyanic acid | 1.0 |
| Acetaldehyde | 1.4 |
| Chlorobutadiene | 0.1 |
| Monovinylacetylene | 1.1 |
| Divinyl acetylene | 0.04 |
| Cyanobutadiene | 0.47 |
| Lactonitrile | 0.25 |

The above reaction products enter scrubber 14 where they are scrubbed with water entering by pipe 15. The amount of water supplied is such as to form a water solution containing approximately 2% of acrylonitrile. The water also dissolves the HCN, acetaldehyde, cyanobutadiene and lactonitrile along with some chlorobutadiene, monovinyl acetylene and divinyl acetylene. The solution from the scrubber 14 leaves by pipe 16 and flows to heater 17.

The acetylene undissolved in the water, together with polymer-forming impurities carried therein, leaves scrubber 14 by pipe 18 and passes into oil scrubber 19. Here the gases are contacted with a hydrocarbon wash oil supplied by pipe 20. The oil serves to dissolve the chlorobutadiene, monovinyl acetylene, divinyl acetylene and cyanobutadiene. The oil solution flows from scrubber 19 by pipe 21. The oil solution may be treated in vessel 22 for removal of the contained polymer-forming impurities either by chlorination, steam-stripping, oxidation or polymerization. The purified oil leaves by pipe 23 and may be reused in the process by conveying it into pipe 20.

The purified acetylene leaves oil scrubber 19 by pipe 24, enters pipe 12 and thereafter is reintroduced into reactor 10 for further reaction together with "make-up" acetylene.

The water solution of acrylonitrile flowing in pipe 16 to heater 17 is therein heated to a temperature just below that point at which polymer-forming impurities are volatilized. This temperature will depend somewhat upon the pressure of the system and the amount of polymer-forming impurities present. Generally, I have found that this temperature will lie between 70° C. and 85° C. The heated solution flows into stripper 26 by pipe 25. Steam is introduced into stripper 26 by pipe 27 and the temperature raised to the point where the volatile polymer-forming impurities are vaporized from the water solution. The exact temperature required will also depend upon the pressure on the liquid at this point and the amount of impurities contained. Generally I have found that in the upper part of scrubber 26 it will lie between 75° C. and 95° C. The temperature is controlled by the amount of steam supplied by means of pipe 27. In order to effect a substantially complete elimination of polymer-forming impurities in stripper 26 it will generally be desirable to volatilize at least 1% but not in excess of 50% of the acrylonitrile contained in the solution. The volatilized acrylonitrile and the polymer-forming impurities leave by pipe 28 and are conducted thereby into scrubber 14. In scrubber 14 the acrylonitrile is dissolved in the relatively cooler water flowing therein, while the polymer-forming impurities will build up in the solution to the point where the recycled acetylene will carry the volatile impurities along into pipe 18 and thence into oil scrubber 19, whereby they are eliminated from the system.

Returning now to the stripper 26, it will be appreciated that the water solution of acrylonitrile obtained therein will have been substantially completely freed of polymer-forming impurities by the action of the steam. The so-purified water solution leaves the stripper 26 by means of pipe 29 and enters stripper 30. In this device additional steam is introduced at a lower point thereof by means of pipe 31, the temperature being raised to such a degree that substantially all of the contained acrylonitrile is boiled out, the same leaving by pipe 32 and being introduced to cooler 33. A mixture of liquid acrylonitrile and water is therefore obtained in the cooler 33, the mixture flowing into separator 34 and forming two layers therein. The upper layer consisting of acrylonitrile saturated with water is withdrawn by pipe 35, while the lower water layer is withdrawn by means of pipe 36. As shown, the water layer containing some acrylonitrile is returned to stripper 30.

The water leaving stripper 30 by pipe 39 is substantially free of acrylonitrile and flows to cooler 37. In this cooler the water is cooled to a temperature below about 40° C. and is returned by pipe 15 to scrubber 14 for reuse in the process. The excess water accumulating in the system due to the condensed steam is withdrawn by means of pipe 38.

What I claim is:

1. The process for purifying a water solution of acrylonitrile containing acetylenic polymer-forming impurities which comprises treating said water solution with steam at a temperature sufficiently high so as to volatilize at least 1% but not in excess of 50% of said acrylonitrile, whereby said polymer-forming impurities are substantially completely eliminated from said water solution and a gaseous mixture of said impurities and acrylonitrile obtained, then treating said gaseous mixture with water and gaseous acetylene, whereby said acrylonitrile is dissolved in said water and said impurities transferred to said acetylene, then treating said acetylene with an absorbent whereby said polymer-forming impurities are removed therefrom.

2. In the process for producing acrylonitrile by the reaction between acetylene and hydrocyanic acid in the presence of an aqueous cuprous chloride containing solution, whereby a gaseous mixture containing acrylonitrile and acetylene together with acetylenic polymer-forming impurities are produced, the improvement which comprises contacting said gaseous mixture in an initial zone with water wherein said acrylonitrile together with said polymer-forming impurities are dissolved, treating said water solution with steam at a temperature sufficiently high so as to volatilize at least 1% but not more than 50% of said acrylonitrile, returning said volatilized polymer-forming impurities and acrylonitrile to said initial zone, wherein said polymer-forming impurities are combined with gaseous acetylene present in said zone and removed therefrom, then treating said gaseous acetylene containing said impurities for removal of said impurities and returning said acetylene to said cuprous chloride containing solution.

References Cited in the file of this patent

UNITED STATES PATENTS

| Number | Name | Date |
|---|---|---|
| 2,324,854 | Kurtz | July 20, 1943 |
| 2,486,659 | Kurtz | Nov. 1, 1949 |
| 2,526,676 | Lovett | Oct. 24, 1950 |

OTHER REFERENCES

Hasche et al., Fiat Final Report, No. 836, pp. 9, 17 (1946).

Carter, Fiat Final Report, No. 1025, pp. 3–4 (1947).

Nill et al., Fiat Final Report, No. 1125, pp. 3–10 (1947).